(12) United States Patent
Goodman et al.

(10) Patent No.: US 9,355,035 B2
(45) Date of Patent: May 31, 2016

(54) DYNAMIC WRITE PRIORITY BASED ON VIRTUAL WRITE QUEUE HIGH WATER MARK FOR SET ASSOCIATIVE CACHE USING CACHE CLEANER WHEN MODIFIED SETS EXCEED THRESHOLD

(71) Applicant: GLOBALFOUNDRIES Inc., Grand Cayman, KY (US)

(72) Inventors: Benjiman L. Goodman, Cedar Park, TX (US); Jody B. Joyner, Austin, TX (US); Stephen J. Powell, Austin, TX (US); William J. Starke, Austin, TX (US); Jeffrey A. Stuecheli, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 219 days.

(21) Appl. No.: 14/082,199

(22) Filed: Nov. 18, 2013

(65) Prior Publication Data

US 2015/0143056 A1    May 21, 2015

(51) Int. Cl.
*G06F 12/00*    (2006.01)
*G06F 12/08*    (2016.01)

(52) U.S. Cl.
CPC ........ *G06F 12/0828* (2013.01); *G06F 12/0864* (2013.01); *G06F 2212/621* (2013.01); *Y02B 60/1225* (2013.01)

(58) Field of Classification Search
CPC ............ G06F 12/0804; G06F 12/0864; G06F 12/0891; G06F 12/123; G06F 12/0828; G06F 2212/621; Y02B 60/1225
USPC .......................... 711/143, 144, 134, 135, 136
See application file for complete search history.

(56) References Cited

U.S. PATENT DOCUMENTS

| | | | |
|---|---|---|---|
| 4,523,206 A * | 6/1985 | Sasscer | G06F 12/0804 711/113 |
| 5,751,993 A | 5/1998 | Ofek et al. | |
| 7,590,803 B2 | 9/2009 | Wintergerst | |
| 8,341,358 B1 | 12/2012 | Edmondson et al. | |
| 8,700,861 B1 * | 4/2014 | Throop | G06F 12/122 711/143 |
| 2011/0093654 A1* | 4/2011 | Roberts | G06F 1/3203 711/105 |
| 2011/0276762 A1* | 11/2011 | Daly | G06F 12/0804 711/122 |
| 2011/0276763 A1 | 11/2011 | Daly et al. | |
| 2014/0372705 A1* | 12/2014 | Goodman | G06F 12/0891 711/135 |
| 2015/0143059 A1* | 5/2015 | Goodman | G06F 12/0864 711/143 |

* cited by examiner

*Primary Examiner* — Hong Kim
(74) *Attorney, Agent, or Firm* — Heslin Rothenberg Farley & Mesiti P.C.

(57) ABSTRACT

A set associative cache is managed by a memory controller which places writeback instructions for modified (dirty) cache lines into a virtual write queue, determines when the number of the sets containing a modified cache line is greater than a high water mark, and elevates a priority of the writeback instructions over read operations. The controller can return the priority to normal when the number of modified sets is less than a low water mark. In an embodiment wherein the system memory device includes rank groups, the congruence classes can be mapped based on the rank groups. The number of writes pending in a rank group exceeding a different threshold can additionally be a requirement to trigger elevation of writeback priority. A dirty vector can be used to provide an indication that corresponding sets contain a modified cache line, particularly in least-recently used segments of the corresponding sets.

20 Claims, 5 Drawing Sheets

DYNAMIC WRITE PRIORITY BASED ON VIRTUAL WRITE QUEUE HIGH WATER MARK FOR SET ASSOCIATIVE CACHE USING CACHE CLEANER WHEN MODIFIED SETS EXCEED THRESHOLD

BACKGROUND OF THE INVENTION

1. Field of the Invention

The present invention generally relates to memory devices for computer systems, and more particularly to a method of managing writebacks from a cache memory.

2. Description of the Related Art

The basic structure of a conventional computer system includes one or more processing units which are connected to various peripheral devices (including input/output devices such as a display monitor, keyboard, and permanent storage device), a memory device such as random access memory (RAM) that is used by the processing units to carry out program instructions and store operand data, and firmware which seeks out and loads an operating system from one of the peripherals (usually the permanent memory device) whenever the computer is first turned on. The processing units typically communicate with the peripheral devices by means of a generalized interconnect or bus. A computer system may have many additional components such as various adapters or controllers, and serial, parallel and universal bus ports for connection to, e.g., modems, printers or network interfaces.

In a symmetric multi-processor (SMP) computer, all of the processing units are generally identical, that is, they all use a common set or subset of instructions and protocols to operate, and generally have the same architecture. A typical architecture includes a processor core having a plurality of registers and execution units, which carry out program instructions in order to operate the computer. The processing unit can also have one or more caches, such as an instruction cache and a data cache, which are implemented using high speed memory devices. Caches are commonly used to temporarily store values that might be repeatedly accessed by a processor, in order to speed up performance by avoiding the longer step of loading the values from a main memory device. These caches are referred to as "on-board" when they are integrally packaged with the processor core on a single integrated chip. A processing unit can include additional caches, such as a level 2 (L2) cache which may support on-board (level 1) instruction and data caches. An L2 cache acts as an intermediary between the main (system) memory and the on-board caches, and can store a much larger amount of information than the on-board caches, but at a longer access penalty. Additional cache levels may be provided, e.g., L3, etc.

A cache has many blocks which individually store the various instruction or data values. The blocks in any cache can be divided into groups of blocks called sets or congruence classes. A set is the collection of cache blocks that a given memory block can reside in. For any given memory block, there is a unique set in the cache that the block can be mapped into, according to preset mapping functions. The number of blocks in a set is referred to as the associativity of the cache, e.g. 2-way set associative means that for any given memory block there are two blocks in the cache that the memory block can be mapped into; however, several different blocks in main memory can be mapped to any given set. A 1-way set associative cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multiprocessor computer system (to indicate the validity of the value stored in the cache, i.e., consistency with the overall system memory architecture). The address tag is usually a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a "read" or "write", to a memory location that maps into the full congruence class, the cache must make one of the blocks in that class available for the new operation. The cache chooses a block by one of a number of means known to those skilled in the art (least recently used (LRU), random, pseudo-LRU, etc.). If the data in the chosen block has been modified, that data is written (cast out) to the next lowest level in the memory hierarchy which may be another cache (in the case of the L1 or on-board cache) or main memory (in the case of an L2 or higher cache). By the principle of inclusion, the lower level of the hierarchy will already have a block available to hold the written modified data. If the data in the chosen block has not been modified, the value in that block can simply be abandoned and not written to the next lowest level in the hierarchy. This process of freeing up a block from one level of the cache hierarchy is known as an eviction. At the end of this process, the cache no longer holds a copy of the evicted block. When a device such as the CPU or system bus needs to know if a particular cache line is located in a given cache, it can perform a "snoop" request to see if the address is in the directory for that cache.

Today's multi-core designs present memory controllers with increasing challenges to keep pace in regard to bandwidth and latency. As many processor cores target a single memory controller, locality is an especially difficult concept to maintain, which adversely affects the scheduling of sequential accesses to main memory with spatial locality. In addition, even though memory I/O frequencies are constantly increasing, critical DRAM timing parameters are not improving at the same rate. All of these factors exacerbate a number of issues facing memory controllers. In particular, with respect to memory writes, they aggravate bus turnaround penalty (especially write-to-read or vice versa), page mode options, and bursty behavior of reads and writes.

Modern processors can force modified data to be cast out of its lowest-level caches into memory due to an LRU eviction policy. For example, in U.S. Patent Application Publication nos. 2011/0276762 (now U.S. Pat. No. 8,838,901) and 2011/0276763 (now U.S. Pat. No. 8,683,128), a method is described to intelligently schedule writebacks of modified data to memory by utilizing the backing of the lowest-level cache to identify castouts that can be scheduled to memory before they become forced writebacks. This approach addresses the problems experienced in current memory controllers (as described above) by leveraging the lowest-level cache to virtually expand the visibility of the memory controller.

FIG. 1 illustrates an exemplary data processing system 100 according to the aforementioned applications. Data processing system 100 includes one or more processor complexes 102, which may be implemented as a chip multiprocessor (CMP) or a multi-chip module (MCM). Processor complex 102 includes at least one processor core 104, which includes logic for processing data under the direction of instructions. Each processor core 104 is capable of simultaneously executing multiple independent hardware threads of execution. Each processor core 104 is supported by a cache hierarchy including one or more upper level caches 106 and a lowest level cache 108, providing processor cores 104 with low latency access to instructions and data retrieved from system memory. While it is typical for at least the highest level cache (i.e., that with the lowest access latency) to be on-chip with the associated core 104, the lower levels of cache memory (including lowest level cache 108) may be implemented as on-chip or off-chip, in-line or lookaside cache, which may be fully inclusive, partially inclusive, or non-inclusive of the contents the upper levels of cache. The lowest-level cache 108 can be shared by multiple processor cores 104, and further can optionally be configured as a victim cache.

Processor complex 102 additionally includes one or more memory controllers (MCs) 110 each controlling read and write access to system (or main) memory, which is the lowest level of storage addressable by the real address space of processor complex(es) 102. Each memory controller 110 is coupled by a memory bus 112 to at least one respective memory channel 120, each of which includes one or more ranks 122 of system memory. A rank 122 can include multiple memory chips 124, which may in turn each contain multiple banks 130 for storing data. The system is not constrained to a particular memory technology but may employ dynamic random access memory (DRAM) for the system memory because of its low cost and high bit density. Each memory channel 120 is connected to one or more dual inline memory modules, each containing numerous DRAM memory chips. These DRAM memory chips are arranged logically into one or more independent accessible banks, and the banks are partitioned into pages. A given memory controller includes a physical read queue that buffers data read from the system memory via the memory bus, and a physical write queue that buffers data to be written to the system memory via the memory bus. The memory controller grants priority to write operations over read operations on the memory bus based upon a number of dirty cache lines in the lowest level cache memory.

SUMMARY OF THE INVENTION

The present invention is generally directed to a method of managing a cache memory of a computer system by loading memory values into cache lines of the cache memory wherein the cache lines are logically organized into sets according to different congruence classes, modifying memory values in selected cache lines, placing writeback instructions for modified cache lines into a virtual write queue of a system memory device, determining that a number of the sets containing at least one modified cache line is greater than a predetermined threshold, and responsively elevating a priority of the writeback instructions. The cache memory may be a lowest level cache memory in a memory hierarchy of the computer system. A memory controller can be provided with a cache cleaner which elevates the priority, and in particular the priority may be raised over read operations to the system memory device. After elevating the priority of the writeback instructions, the cache cleaner can determine that a second number of the sets containing at least one modified cache line is less than a second predetermined threshold, and responsively lower the priority of the writeback instructions, i.e., back to normal. The two threshold values can be programmable by the operating system. In an embodiment wherein the system memory device includes a plurality of ranks forming different rank groups, the congruence classes can be mapped based on the rank groups. The writeback priority elevation can be further responsive to determining that a number of writeback instructions for a given rank group is greater than a second predetermined threshold. The cache cleaner can use a dirty vector comprised of a plurality of bits which provide an indication that corresponding sets contain at least one modified cache line. In an exemplary implementation, the dirty vector bits provide an indication that corresponding sets contain at least one modified cache line in a least-recently used segment of the corresponding sets.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention adds to the prior art described in U.S. Patent Application Publication nos. 2011/0276762 (now U.S. Pat. No. 8,838,901) and 2011/0276763 (now U.S. Pat. No. 8,683,128) by building a structure known as the dirty vector in the memory controller, which tracks the amount of congruence classes (sets) within the lowest-level cache that contain modified cache lines. When the number of dirty sets within a virtual write queue of the lowest-level cache exceeds a programmable threshold (high water mark), the memory controller dynamically elevates the priority of these scheduled writebacks (potentially at the expense of reads being sent to main memory) as they are processed to main memory. This elevated priority of scheduled writes to main memory continues until a burst of castouts are executed in order to allow the number of dirty sets in the virtual write queue to dip below a programmable low water mark.

This mechanism allows scheduled castouts to be written to main memory mostly during idle cycles of the memory bus (i.e., when there are no reads to service). So, writes to main memory are prioritized over reads only when the memory controller's expanded view (via the virtual write queue) dictates that the number of dirty sets in the lowest-level cache is reaching a critical limit, one in which forced writebacks become increasingly probable and the optimal stream of memory writes is jeopardized. Therefore, even in the midst of a burst of reads and writes, intelligent choices can still be made by the DRAM scheduler in the memory controller in terms of when writes can most efficiently be processed to main memory.

Figure 2:
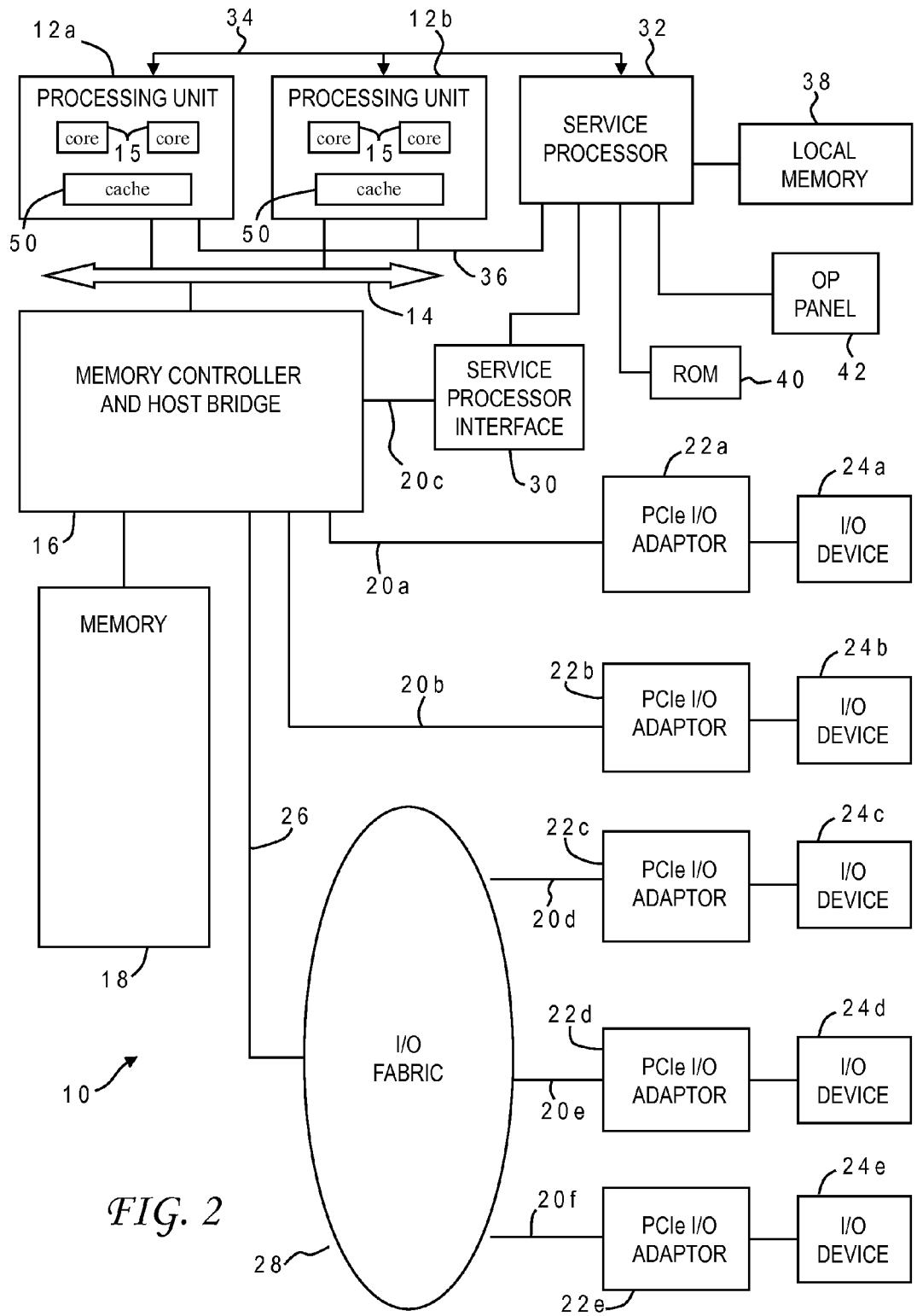
FIG. 2 is a block diagram of a computer system constructed in accordance with one embodiment of the present invention.

With reference now to the figures, and in particular with reference to FIG. 2, there is depicted one embodiment 10 of a computer system constructed in accordance with the present invention. Computer system 10 is a symmetric multiprocessor (SMP) system having a plurality of processing units 12a, 12b connected to a system bus 14. Although only two processing units are shown, it is understood that computer system 10 could have many more than two. In this embodiment each processing unit includes a plurality of processor cores 15 and one or more local caches 50. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

Figure 1:
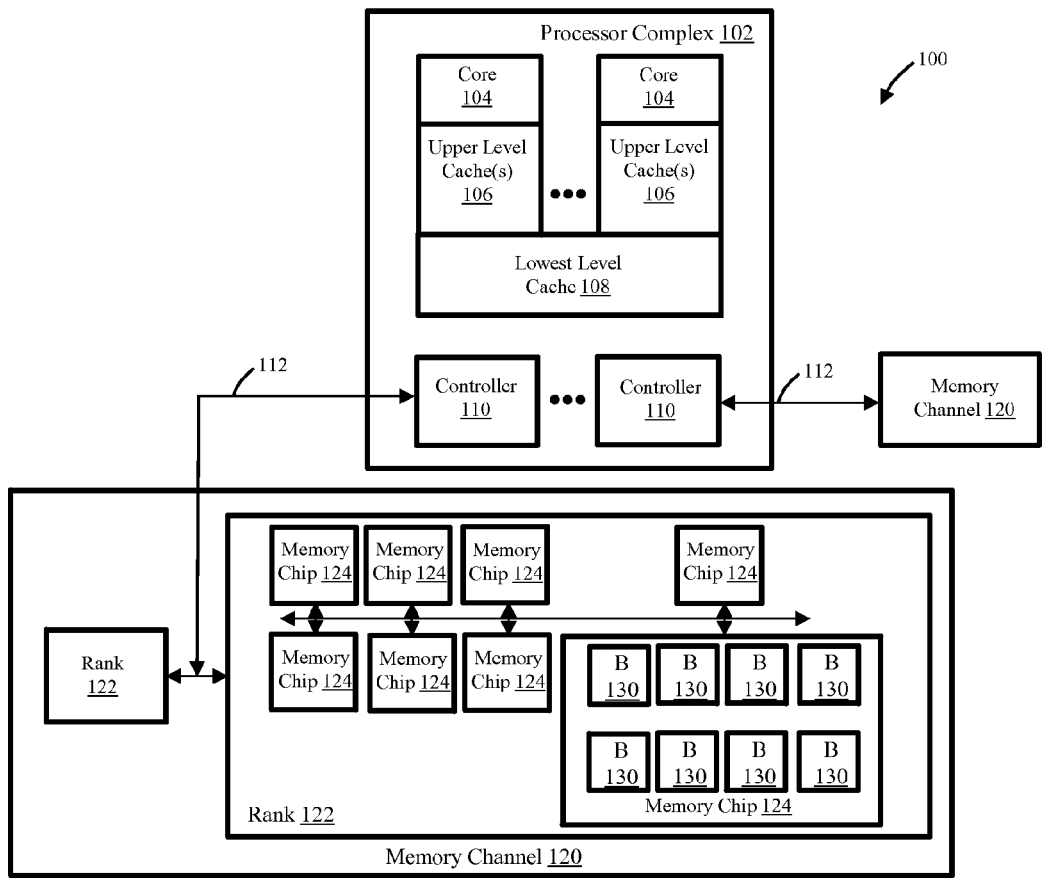
FIG. 1 is a detailed view of a portion of a processor complex and memory subsystem of a conventional computer system.
Figure 3:
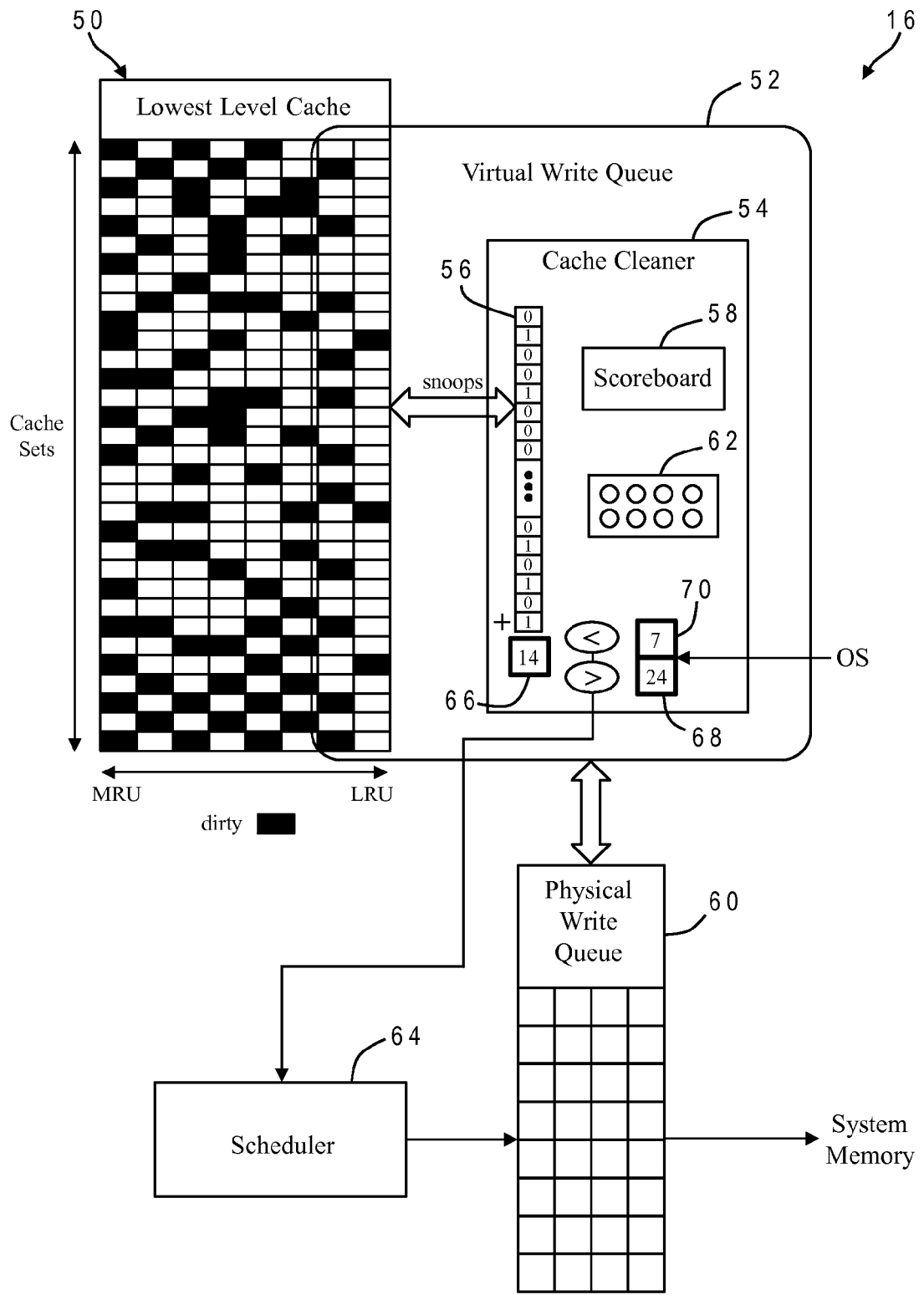
FIG. 3 is a block diagram of a portion of a cache used by one of the processing units in the computer system of FIG. 2 interfacing with a memory controller in accordance with one embodiment of the present invention, having a virtual write queue and cache cleaner which uses a dirty vector to track the number of congruence classes (preferably LRU subsets) having a modified cache line and responsively elevate a priority of writeback instructions.

Referring now to FIG. 3, one embodiment of a cache 50 for the processing units 12a, 12b is shown. While the present invention may be applied to any cache/controller, it is intended primarily for use at the lowest level cache (i.e., the one closest in functionality to system memory). The present invention applies to associative caches, so the cache entry array of cache 50 is divided into a plurality of different cache sets according to the particular congruence class mapping desired. Any mapping may be used, and may be based on the given memory configuration of computer system 10. If the memory includes the rank design seen in FIG. 1 then it is preferable to use a congruence class mapping which groups adjacent bits within the cache array to congruence classes within the same memory region (rank group). While FIG. 3 depicts only 32 cache sets, the number of sets presented may be considerably higher, and is essentially unlimited. Likewise, the number of cache lines in each set for FIG. 3 is eight but this number may vary. In an exemplary implementation, there are 8,192 (8 k) sets, 16-way.

For each lowest level cache 50, memory controller 16 creates a virtual write queue 52 including a cache cleaner 54. The virtual write queue is "virtual" in the sense that there is no physical circuitry forming a separate array for the writebacks, but rather the writebacks logically correspond to certain entries of the cache. It is advantageous to design cache cleaner 54 to avoid interference with mainline cache operations, so the cache cleaner logic can be located within the circuit design off to the side of the mainline flow, and essentially snoops directory accesses from the dispatch pipe to determine whether a given congruence class contains any dirty cache lines, i.e., any cache line whose value has been modified by a processor, and may now be inconsistent with the rest of the memory hierarchy, in particular with system memory. In the exemplary embodiment, each cache set is considered as having cache lines ordered from most recently used (MRU) to least recently used (LRU), and the lower quarter of the LRU lines are used as the virtual write queue 52. For the above-mentioned configuration this correlates to the last four LRU members for each of the 8 k 16-way sets within the memory cache, and cache cleaner 54 accordingly considers only those dirty cache lines within this segment of the LRU lines, which collectively comprise the entries of virtual write queue 52. If a dirty cache line is found within this LRU segment for a directory read access (not initiated by the cache cleaner), then it is considered a candidate to be cleaned, i.e., the value written back to main memory, and the cache line evicted. This limiting of dirty cache line consideration to the lower quarter of the LRU is preferred but not required, as any portion of the set, including the entire set, may be considered.

This information on dirty cache lines can be logged in an array or dirty vector 56 of cache cleaner 54. Dirty vector 56 contains a single bit per congruence class entry (8 k bits for the exemplary implementation). If a dirty vector bit is set, it means that at least one member of a given congruence class is modified (and not cleaned) within its lower LRU segment. These bits thus act as an indication that some cleaning action potentially needs to be performed. The dirty vector is not necessary directly indexed by a congruence class number. Cache cleaner 54 may further include appropriate control circuitry to make an intelligent association of the next write-back to service by partitioning the array into regions based upon the main memory configuration. For the previously described memory configuration having multiple ranks of memory with each rank having multiple banks, each congruence class can map to a particular rank group for a given port of the memory buffer in the asynchronous domain. In the preferred embodiment the memory buffer in the asynchronous domain (MBA) is where the DRAM scheduling and prioritization actually takes place, which is separate from the memory buffer in the synchronous domain (MBS), where the cleaner and memory cache reside. In this context, a rank group refers to a modulo-4 conversion for the number of ranks configured in a given system. For example, if a maximum configuration of 32 ranks is enabled per MBA port pair, then 8 physical ranks for an MBA identifier fold into a single rank group as managed by the cleaner. That is, physical ranks 0, 4, 8, 12, etc., for an MBA port pair map to rank group 0, while physical ranks 1, 5, 9, 13, etc., map to rank group 1, and so forth. With this approach, cache cleaner 54 can partition dirty vector 56 into regions where adjacent bits correspond to the same channel/rank/bank resource. In an implementation wherein there are up to eight unique rank groups that are tracked within the congruence class, the cache cleaner design can isolate two bits in the congruence class corresponding to four ranks for the memory configuration, plus a bit for the MBA identifier. The net goal of this logic is to provide dense storage that contains hints which allow the cleaner mechanism to search and identify a congruence class to clean for a given port/rank/bank with superior efficiency.

In the exemplary embodiment dirty vector 56 is a 128×64 b 1r1w common register file (CRF) whose write port is managed via the snoop bus of the cache for various directory accesses. Generally, directory reads that are not initiated by the cache cleaner can set or reset the dirty vector bits based upon whether dirty members are still found in the lower quadrant of the LRU. In the meantime, cleaner-initiated directory writes can reset the dirty vector value (to zero). This allows a cleaner scoreboard 58, which controls the array's read port, to recognize that a given congruence class is an eligible candidate to be cleaned in the future. A "chicken-switch" (a method of troubleshooting which disables optimizations to isolate problems) can be made available to cause the dirty vector logic to ignore cleaner-initiated directory writes altogether, which means that they would be strictly updated by directory reads only.

Cache cleaner scoreboard 58 effectively acts as the work queue for the respective memory regions configured for a memory chip. It can be organized so that each entry points to a rank group as mapped to within the congruence class, for example, correlating to a maximum of 8 active entries (up to 4 ranks per 2 MBA ports) where each entry tracks the activity of up to eight associated banks. The primary function of scoreboard 58 is to identify the next congruence class that should be optimally scheduled based upon the amount of work present in the dirty vector and the needs of the write reorder queue (the physical write queue) within the MBA and then, subsequently, to hand off the processing of the clean operation for a given bank to the cleaner state machines 62 (finite state machines).

Typically, read operations are favored by the memory controller's command logic over write transfers. Write commands usually fill in during idle cycles when openings occur or when they are forced due to address contention. However, there are instances where the overall performance of the system can be enhanced if writes are given priority over reads. In the exemplary implementation, the cache cleaner's expanded view of the memory hierarchy can be utilized to help a DRAM scheduler 64 make the most optimal command decisions. In particular, on a per rank group basis, cache cleaner 54 can monitor the fullness of the LRU segments in order to decide when it is time to prioritize writes. If the LRU segments begin to fill up with dirty cache lines, the cache cleaner urges scheduler 64 to drain some writes in order to prevent a burst of reads and writes to memory in the future. To that end, a register 66 is used to maintain a count of the number of dirty vector bits that are currently set. Whenever the dirty vector bit count in register 66 exceeds a programmable high water mark value stored in another register 68, cache cleaner 54 initiates a level signal to the MBA to treat operations in its write reorder queue as high-priority transfers, in particular, a higher priority than read operations. Whenever cache cleaner detects that the number of dirty vector bits has dipped below a programmable low water mark value stored in another register 70, it deasserts the level signal to the MBA logic to inform it that it can release its high priority window. The threshold values in registers 68 and 70 may be set, for example, by the operating system (OS) or other administrative program. These modes can be fully programmable for the purpose of performance tuning with the delta between the two markers being a targeted burst length.

Figure 4:
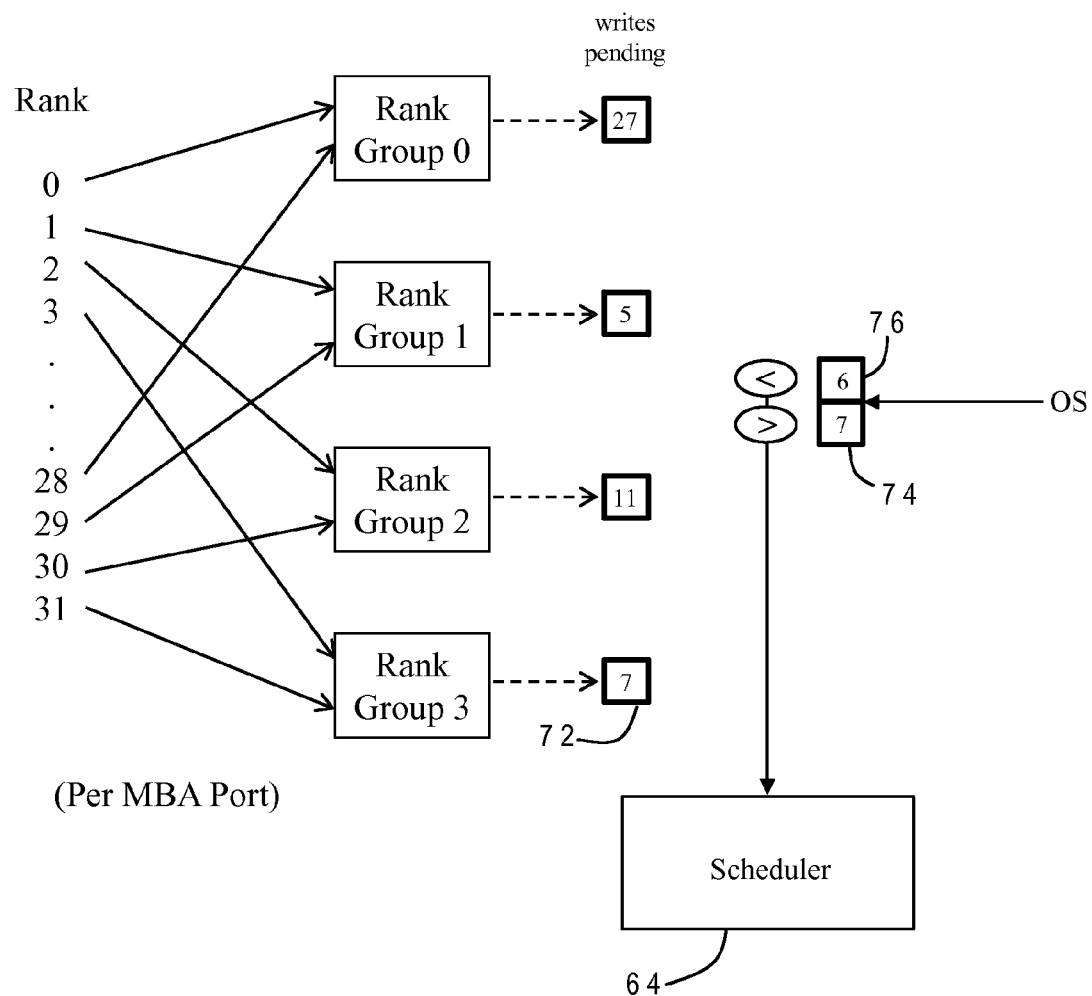
FIG. 4 is a block diagram illustrating how ranks of system memory can be grouped together in accordance with one embodiment of the present invention to additionally condition elevation of writeback priority based on the number of writebacks pending in a rank group.

In addition to the number of set dirty vector bits being a basis for raising priority of writebacks, the system may optionally make a further requirement regarding how many writeback instructions are present in the MBA's write reorder queue on a per rank group basis. As noted above, the system may allow for a configuration of 32 ranks enabled per MBA port pair, with 8 physical ranks for an MBA identifier folded into a single rank group as managed by the cleaner. This results in four rank groups as seen in FIG. 4. The additional requirement that feeds into the write priority elevation is that a separate high water mark in register 74 has been eclipsed for the number of writes pending in a given rank group's allocation of the write reorder queue in one or more of registers 72. Similar to the dirty vector, the writeback priority is reduced when the number of writes 72 in a rank group's write reorder queue allocation dips below a low water mark in another register 76.

The upper and lower threshold values for the dirty vector bits as well as the number of writes pending in the write reorder queue may vary considerably depending on application, architecture and designer preference. In the exemplary embodiment the high watermark for the dirty vector is programmed to the 50% level (4 k sets) and the low watermark is programmed to 4 k-64 to allow a burst of writes to proceed safely below the high watermark. In the exemplary embodiment the write reorder queue allows 32 pending writes per MBA with two MBA ports configured. For an optimum configuration, there are four rank groups per MBA port, so the write reorder queue is partitioned into allocations of 8 slots per rank group. So, just as the dirty vector priority thresholds are programmable, the write reorder queue's thresholds are likewise programmable/configurable. The high watermark for each rank group's write reorder queue allocation is preferably set to 7 and its low watermark is set to 6. An implementation of the present invention could rely solely upon the dirty vector high/low watermarks, but the combination of the dirty vector and write reorder queue thresholds allows the cleaner to more targetedly elevate the write priority only when necessary.

FIGS. 3 and 4 illustrates those novel features which are salient to the present invention, but the memory hierarchy may include other conventional features not shown, including without limitation a cache directory, a physical read queue, and various control logic. Any of these novel or conventional features may be included as part of cache 50, or as part of system memory controller 16 (which may then include a plurality of sets of these features, one for each local cache, i.e., per processing unit 12).

Figure 5:
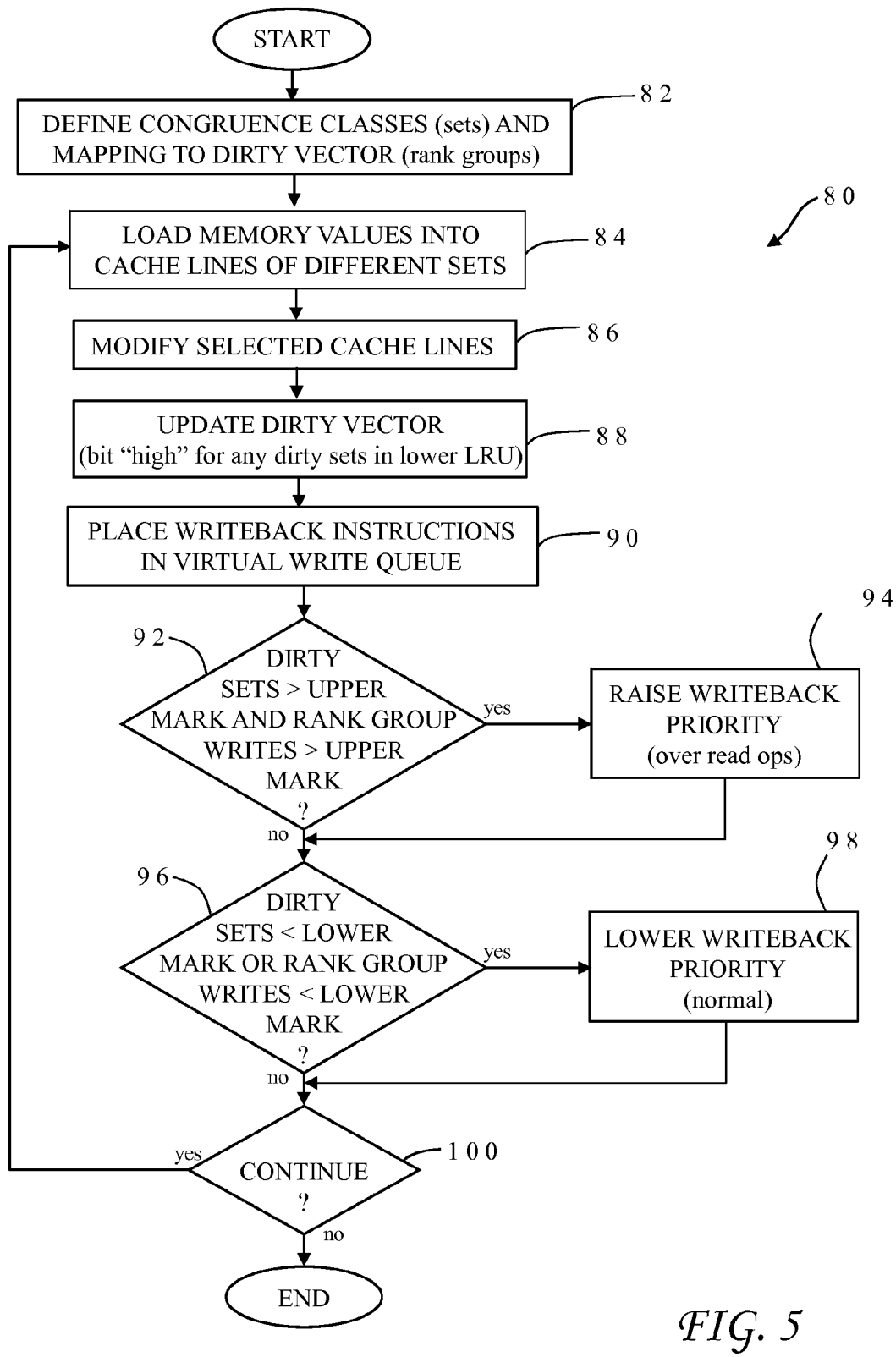
FIG. 5 is a chart illustrating the logical flow for a cache management routine in accordance with one implementation of the present invention which selectively elevates the priority of scheduled writebacks from the cache of FIG. 3 to main memory when the number of dirty sets indicated by the dirty vector exceeds a programmable threshold.

The invention may be further understood with reference to the chart of FIG. 5 which illustrates a cache management process 80 in accordance with one implementation, carried out by appropriate circuitry within cache 50 and memory controller 16. Process 80 begins with the congruence class definitions and any mapping of the classes (e.g., by rank groups) to the dirty vector bits (82). During operation of the computer system, memory values are loaded into cache lines of different sets (84), and some of these cache lines become modified (86). As the cache lines are modified, the operations are being snooped to update the dirty vector (88), and writeback instructions are logically placed in the virtual write queue (90). As operation continues, if the number of dirty sets, or bits in the dirty vector, exceeds the first upper threshold and the number of writebacks for a rank group exceeds the second upper threshold (92), then the writeback priority is raised, e.g., over read operations (94). If either the number of dirty sets is less than the lower threshold or the number of writebacks for a rank group is less than upper threshold (96), then the writeback priority is lowered (98). This process continues (100) for so long as the computer system operates and memory values continue to be loaded and modified in the cache. The result is enough cleaning of the cache so that subsequent cache allocations can occur without any LRU contention, which benefits memory throughput and reduces power by limiting the number of demand castouts.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to a "main" memory, but it is equally applicable to distributed memory systems such as non-uniform memory access (NUMA). Also, the exemplary implementation applies the invention to the interface between the lowest level cache and main memory, but there are some applications where the main memory itself may be equivalent to a cache memory, such as in a cloud computing context. It is therefore contemplated that such modifications can be made without departing from the spirit or scope of the present invention as defined in the appended claims.

What is claimed is:

1. A memory controller comprising:
  a virtual write queue containing writeback instructions for selected cache lines of a cache memory to be written to a system memory device wherein the cache memory logically organizes the cache lines into sets according to different congruence classes; and
  a cache cleaner which determines when a number of the sets containing at least one modified cache line is greater than a first predetermined threshold, and responsively elevates a priority of the writeback instructions; and after elevating the priority of the writeback instructions, further determines that a second number of the sets containing at least one modified cache line is less than a second predetermined threshold, and responsively lowers the priority of the writeback instructions.

2. The memory controller of claim 1, wherein the priority of the writeback instructions is elevated over read operations.

3. The memory controller of claim 1, wherein said cache cleaner includes first and second programmable registers storing the first and second predetermined thresholds, respectively.

4. The memory controller of claim 1, wherein the system memory device includes a plurality of ranks forming different rank groups, and the congruence classes are mapped based on the rank groups.

5. The memory controller of claim 4, wherein the predetermined threshold is a first predetermined threshold, and the priority is elevated responsive to the cache cleaner further determining that a number of writeback instructions for a given rank group is greater than a second predetermined threshold.

6. The memory controller of claim 1, wherein the cache cleaner includes a dirty vector comprised of a plurality of bits providing an indication that corresponding sets contain at least one modified cache line.

7. The memory controller of claim 6, wherein the bits in the dirty vector provide an indication that corresponding sets contain at least one modified cache line in a least-recently used segment of the corresponding sets.

8. A computer system comprising:
  at least one processor which processes program instructions;
  a system memory device which stores the program instructions and operand data;
  at least one local cache memory for said processor which stores memory values in cache lines corresponding to memory blocks of said system memory device, the cache lines being logically organized into sets according to different congruence classes; and
  a memory controller which creates a virtual write queue containing writeback instructions for selected cache lines of said local cache memory to be written to said system memory device, and includes a cache cleaner which determines when a number of the sets containing at least one modified cache line is greater than a first predetermined threshold, and responsively elevates a priority of the writeback instructions; and after elevating the priority of the writeback instructions, further determines that a second number of the sets containing at least one modified cache line is less than a second predetermined threshold, and responsively lowers the priority of the writeback instructions.

9. The computer system of claim 8, wherein the priority of the writeback instructions is elevated over read operations for said system memory device.

10. The computer system of claim 8, wherein the cache cleaner includes first and second programmable registers storing the first and second predetermined thresholds, respectively.

11. The computer system of claim 8, wherein the system memory device includes a plurality of ranks forming different rank groups, and the congruence classes are mapped based on the rank groups.

12. The computer system of claim 11, wherein the predetermined threshold is a first predetermined threshold, and the priority is elevated responsive to the cache cleaner further determining that a number of writeback instructions for a given rank group is greater than a second predetermined threshold.

13. The computer system of claim 8, wherein the cache cleaner includes a dirty vector comprised of a plurality of bits providing an indication that corresponding sets contain at least one modified cache line.

14. The computer system of claim 13, wherein the bits in the dirty vector provide an indication that corresponding sets contain at least one modified cache line in a least-recently used segment of the corresponding sets.

15. A method of managing a cache memory of a computer system comprising:
loading memory values into cache lines of the cache memory wherein the cache lines are logically organized into sets according to different congruence classes;
modifying memory values in selected cache lines;
placing writeback instructions for modified cache lines into a virtual write queue of a system memory device;
determining that a number of the sets containing at least one modified cache line is greater than a predetermined threshold;
responsive to the determining, elevating a priority of the writeback instructions; and
after elevating the priority of the writeback instructions, second determining that a second number of the sets containing at least one modified cache line is less than a second predetermined threshold; and
responsive to the second determining, lowering the priority of the writeback instructions.

16. The method of claim 15, wherein the cache memory is a lowest level cache memory in a memory hierarchy of the computer system.

17. The method of claim 15, wherein said elevating raises the priority of the writeback instructions over read operations.

18. The method of claim 15, wherein the system memory device includes a plurality of ranks forming different rank groups, and the congruence classes are mapped based on the rank groups.

19. The method of claim 15, wherein said determining uses a dirty vector comprised of a plurality of bits providing an indication that corresponding sets contain at least one modified cache line.

20. The method of claim 19, wherein the bits in the dirty vector provide an indication that corresponding sets contain at least one modified cache line in a least-recently used segment of the corresponding sets.

\* \* \* \* \*